United States Patent Office 2,854,469
Patented Sept. 30, 1958

---

2,854,469
PESTICIDAL COMPOSITION OF MATTER

Edwin G. Wallace, Walnut Creek, and Llewellyn W. Fancher, Pleasant Hills, Calif., assignors to Stauffer Chemical Company, a corporation of Delaware No Drawing. Application March 2, 1956
Serial No. 568,997

2 Claims. (Cl. 260—461)

The present invention relates to a novel composition of matter and to the use of the composition as a plesticide. More particularly, the invention relates to S-(4-chlorophenylmercaptomethylmercaptomethyl) O,O, diethyl monothiophosphate having the structural formula:

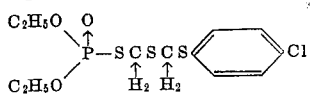

which is, for convenience, hereinafter referred to as R-1865.

The compound of the present invention may be made in the following manner: Fourteen and one-half grams (14.5 g.) (0.1 M) of p-chlorothiophenol, 10.6 g. (0.1 M) of sodium carbonate and 50 cc. of dioxane were digested on a steam-bath for five minutes. Then 18.7 gr. (0.1 M) of ammonium-diethylmonothiophosphate was added followed by 13.1 g. (0.1 M) of dichlorodimethyl sulfide (ClCH$_2$)$_2$S. The mixture was stirred for ten minutes then heated on the steam-bath under reflux for 2.5 hours. The bulk of the solvent was removed by evaporation on a steam-bath with an air jet, and the residual liquid was taken up in 100 cc. of benzene and washed four times with aqueous dilute sodium chloride solution. After drying over anhydrous potassium carbonate and filtering, the benzene was removed on a steam-bath. The product was a thick yellow liquid, weighed 31.4 grams. N$_D^{28}$1.5835.

The compound of the present invention was extensively tested against various pests. In one series of tests, 5 grams of the compound was added to acetone to make 100 ml. of solution. The solution was diluted with water containing 0.01% "Vatsol," a sulfonate-type wetting agent, and 0.005% methyl cellulose as emulsifiers. In each case the amount of water added was sufficient to make a solution of the desired concentration, as set forth in the table. The compounds were then sprayed into small screened cages containing various pests. The following results were obtained:

| Insect or Mite | Concentration | Mortality (percent) |
|---|---|---|
| Musca domestica (housefly) | 30 micrograms/ml | 84 |
| | 20 micrograms/ml | 50 |
| | 10 micrograms/ml | 10 |
| Oncopeltus fasciatus (milkweed bug) | 0.06% | 100 |
| | 0.03% | 90 |
| Periplaneta americana (American cockroach) | 0.06% | 100 |
| | 0.03% | 90 |
| Tribolium confusum (confused bettle (flour) | 0.06% | 100 |
| | 0.03% | 20 |
| Aphis fabae (bean aphis) | 0.005% | 100 |
| | 0.001% | 67 |

| | | Post-embryonic | Eggs |
|---|---|---|---|
| Tetranychus bimaculatus (two-spotted mite) | 0.005% | 100 | 100 |
| | 0.001% | | 37 |

The residue from a 0.03% spray on bean plants controlled T. bimaculatus for 26 days.

We claim:

1. As a composition of matter S-(4-chlorophenylmercaptomethylmercaptomethyl) O,O,diethyl monothiophosphate.

2. The method of combatting pests, comprising applying to a pest habitat an effective amount of S-(4-chlorophenylmercaptomethylmercaptomethyl) O,O,d i e t h y l monothiophosphate.

References Cited in the file of this patent

UNITED STATES PATENTS

| 2,494,126 | Hoegberg | Jan. 10, 1950 |
| 2,494,283 | Cassaday et al. | Jan. 10, 1950 |
| 2,571,989 | Schrader | Oct. 16, 1951 |
| 2,596,076 | Hook et al. | May 6, 1952 |
| 2,668,828 | Tolkmith | Feb. 9, 1954 |

FOREIGN PATENTS

| 830,509 | Germany | Feb. 25, 1953 |